(12) United States Patent
Lee et al.

(10) Patent No.: US 8,856,828 B2
(45) Date of Patent: Oct. 7, 2014

(54) METHOD FOR FORMING A BROADCAST PROGRAM TIME TABLE USING ELECTRIC PROGRAM GUIDE

(75) Inventors: Young-Gu Lee, Suwon-si (KR); Hoon Yoo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1015 days.

(21) Appl. No.: 11/416,554

(22) Filed: May 3, 2006

(65) Prior Publication Data

US 2006/0253865 A1 Nov. 9, 2006

(30) Foreign Application Priority Data

May 3, 2005 (KR) .................. 10-2005-0037293

(51) Int. Cl.
| | | |
|---|---|---|
| *H04N 5/445* | (2011.01) | |
| *H04N 21/235* | (2011.01) | |
| *H04N 21/435* | (2011.01) | |
| *H04N 21/433* | (2011.01) | |
| *H04N 21/434* | (2011.01) | |
| *H04H 60/72* | (2008.01) | |

(52) U.S. Cl.
CPC ............. *H04H 60/72* (2013.01); *H04N 21/235* (2013.01); *H04N 21/435* (2013.01); *H04N 21/4332* (2013.01); *H04N 21/4345* (2013.01)
USPC ............................................. 725/39; 725/50

(58) Field of Classification Search
CPC .......... H04N 21/4622; H04N 5/44543; H04N 21/482; H04N 21/84
USPC .................... 725/37–39, 48–50; 709/217–232
See application file for complete search history.

(56) References Cited

U.S. PATENT DOCUMENTS

| | | | | |
|---|---|---|---|---|
| 5,818,441 A | * | 10/1998 | Throckmorton et al. | 715/717 |
| 6,345,298 B1 | * | 2/2002 | Moriya | 709/228 |
| 7,278,154 B2 | * | 10/2007 | Harrison et al. | 725/141 |

(Continued)

FOREIGN PATENT DOCUMENTS

| | | |
|---|---|---|
| EP | 1 763 236 | 3/2007 |
| JP | 10-174011 | 6/1998 |
| JP | 2005-101859 | 4/2005 |

OTHER PUBLICATIONS

Sun et al., "Storage Scheme of System Information for Digital Television Receiver", IEEE Transactions on Consumer Electronics, Feb. 1, 2003.

(Continued)

*Primary Examiner* — Annan Shang
(74) *Attorney, Agent, or Firm* — The Farrell Law Firm, P.C.

(57) ABSTRACT

A method for making a broadcast program time table using an electric program guide database is disclosed. The method includes storing present program information of event information table present/follow (EIT P/F) information in a first program information area of a corresponding segment area in the electric program guide (EPG) database by determining a segment, in which program discontinuity occurs, in an event information table (EIT) schedule if the EIT P/F information is received, and storing program information of an $N^{th}$ segment in a second program information area when the $N^{th}$ segment of the EIT schedule is received, and program discontinuity occurs in the $N^{th}$ segment, the $N^{th}$ segment being a segment included in the received EIT schedule.

3 Claims, 8 Drawing Sheets

SEGMENT 3
| 09:00:00 ~ 10:59:59 →PRO BASEBALL |
| 11:00:00 ~ 12:29:59 → FILM |

SEGMENT 4
| 12:30:00 ~ 13:29:59 → DRAMA A |
| 13:30:00 ~ 13:59:59 → NEWS |
| 14:00:00 ~ 15:59:59 →PRO FOOTBALL |

EIT P/F
| (PRESENT) 11:00:00 ~ 12:29:59 → FILM |
| (NEXT) 12:30:00 ~ 13:29:59 → DRAMA A |

(56) References Cited

U.S. PATENT DOCUMENTS

| | | | | |
|---|---|---|---|---|
| 7,546,627 B2* | 6/2009 | Kawai | | 725/142 |
| 8,160,089 B1* | 4/2012 | Padiyar et al. | | 370/445 |
| 8,578,419 B2* | 11/2013 | Bayrakeri et al. | | 725/47 |
| 2002/0135698 A1 | 9/2002 | Shinohara | | |
| 2002/0161822 A1* | 10/2002 | Hamada et al. | | 709/201 |
| 2005/0086692 A1* | 4/2005 | Dudkiewicz et al. | | 725/46 |
| 2005/0204385 A1* | 9/2005 | Sull et al. | | 725/45 |

OTHER PUBLICATIONS

Seung et al., Design and Implementation of DVB-T Receiver System for Digital TV, IEEE Transactions of Consumer Electronics, Nov. 1, 2004.

Digital Video Broadcasting (DVB); Guidelines on Implementation and Usage of Service Information (SI), ETSI TR 101 211 V1.5.1, Oct. 3, 2003.

* cited by examiner

METHOD FOR FORMING A BROADCAST PROGRAM TIME TABLE USING ELECTRIC PROGRAM GUIDE

PRIORITY

This application claims priority to an application entitled "Method for Making Broadcast Program Time Table using Electric Program Guide Database" filed in the Korean Intellectual Property Office on May 3, 2005 and assigned Serial No. 2005-37293, the contents of which are incorporated herein by reference.

BACKGROUND OF THE INVENTION

1. Field of the Invention

The present invention relates to a method for forming a broadcast program time table in a database by receiving digital multimedia broadcast program specific information/service information (PSI/SI), and more particularly to a method for forming a broadcast program time table so that program information can be continuously provided.

2. Description of the Related Art

Generally, program specific information/service information (PSI/SI) is called an electric program guide (EPG). In order to form a broadcast program time table in a database, an event information table (EIT) of the EPG is used.

The EIT may be divided into a schedule area and a present/follow (P/F) area. The schedule area has broadcast program information corresponding to a minimum of one day to the maximum of four days. The P/F area has a present broadcast program information and a next broadcast program information.

FIG. 1 illustrates the structure of an EIT schedule.

A basic unit of the EIT schedule area is known as a section. More than 1 to less than 8 sections form one segment. The segment includes program information corresponding to three hours. Segment #0 includes section #0 to section #N ($0 \leq N \leq 7$). Segment #0 includes program information between 00:00:00 and 02:59:59. In detail, segment #0 to segment #7 include program information between 00:00:00 and 23:59:59. Segment #8 to segment #15 include program information between 24:00:00 to 47:59:59. The EIT schedule area may have a broadcast program time table corresponding to a maximum of four days.

When the EIT schedule is transmitted, broadcasted program information is excluded. For example, if the current time is 11:00:00, program information corresponding to segments #0, #1, and #2 are not transmitted, and program information corresponding to segments #3, #4, #5, etc. are transmitted.

It is noted that even the basic unit of the EIT P/F area is a section. However, the section of the EIT P/F area is different from the section of the EIT schedule area. Section #0 of the EIT P/F area includes a present broadcast program information, and section #1 includes a next broadcast program information.

FIG. 2 and FIG. 3 illustrate the structures of the segments of the EIT schedule area and the EIT P/F area.

Left segments #3 and #4 represents the EIT schedule, and the right segment represents the EIT P/F.

If a user receives an EIT schedule before 12:00:00, the user can obtain segment #3 and segment #4 shown in FIG. 2. However, if the user receives an EIT schedule between 12:00:00 to 12:29:59, the user receives only segment #4 as shown FIG. 3. Therefore, it is difficult for the user to view information about a film which is a program broadcasted between 11:00:00 and 12:29:59. Accordingly, the discontinuity of program information may occur. In this case, although the user can know a present broadcast program through the EIT P/F, if only the EIT schedule is used, the EIT schedule may be displayed as if there was no program between 12:00:00 and 12:29:59.

SUMMARY OF TH INVENTION

Accordingly, the present invention has been made to solve the above-mentioned problems occurring in the prior art, and an object of the present invention is to provide a method for maintaining continuity of program information using present program information of the EIT P/F when a broadcast program table is formed in a database by using an EPG.

To accomplish the above object, there is provided a method for forming a broadcast program time table in an electric program guide (EPG) database, the method including storing present program information of event information table present/follow (EIT P/F) information in a first program information area of a corresponding segment area in the EPG database by determining a segment, in which program discontinuity occurs, in an EIT schedule if the EIT P/F information is received, and storing program information of an $N^{th}$ segment in a second program information area when the $N^{th}$ segment of the EIT schedule is received, and program discontinuity occurs in the $N^{th}$ segment, the $N^{th}$ segment being a segment included in the received EIT schedule.

According to another aspect of the present invention, there is provided a method for forming a broadcast program time table in an electric program guide (EPG) database, the method including storing present program information of event information table present/follow (EIT P/F) information in a first program information area of a corresponding segment area in the EPG database by determining a segment, in which program discontinuity occurs, in an event information table (EIT) schedule when the EIT P/F information is received, determining if the present program information of the EIT P/F information is stored in the first program information area of an $N^{th}$ segment area of the EPG database if the $N^{th}$ segment of the EIT schedule is received, the $N^{th}$ segment being a segment included in the received EIT schedule, storing program information of the $N^{th}$ segment in a second program information area when the stored present program information of the EIT P/F information exists, determining if program discontinuity occurs in the $N^{th}$ segment when the stored present program information of the EIT P/F information does not exist, storing program information of the $N^{th}$ segment in the second program information area when program discontinuity occurs in the $N^{th}$ segment, and storing the program information of the $N^{th}$ segment in the first program information area when program discontinuity does not occur.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
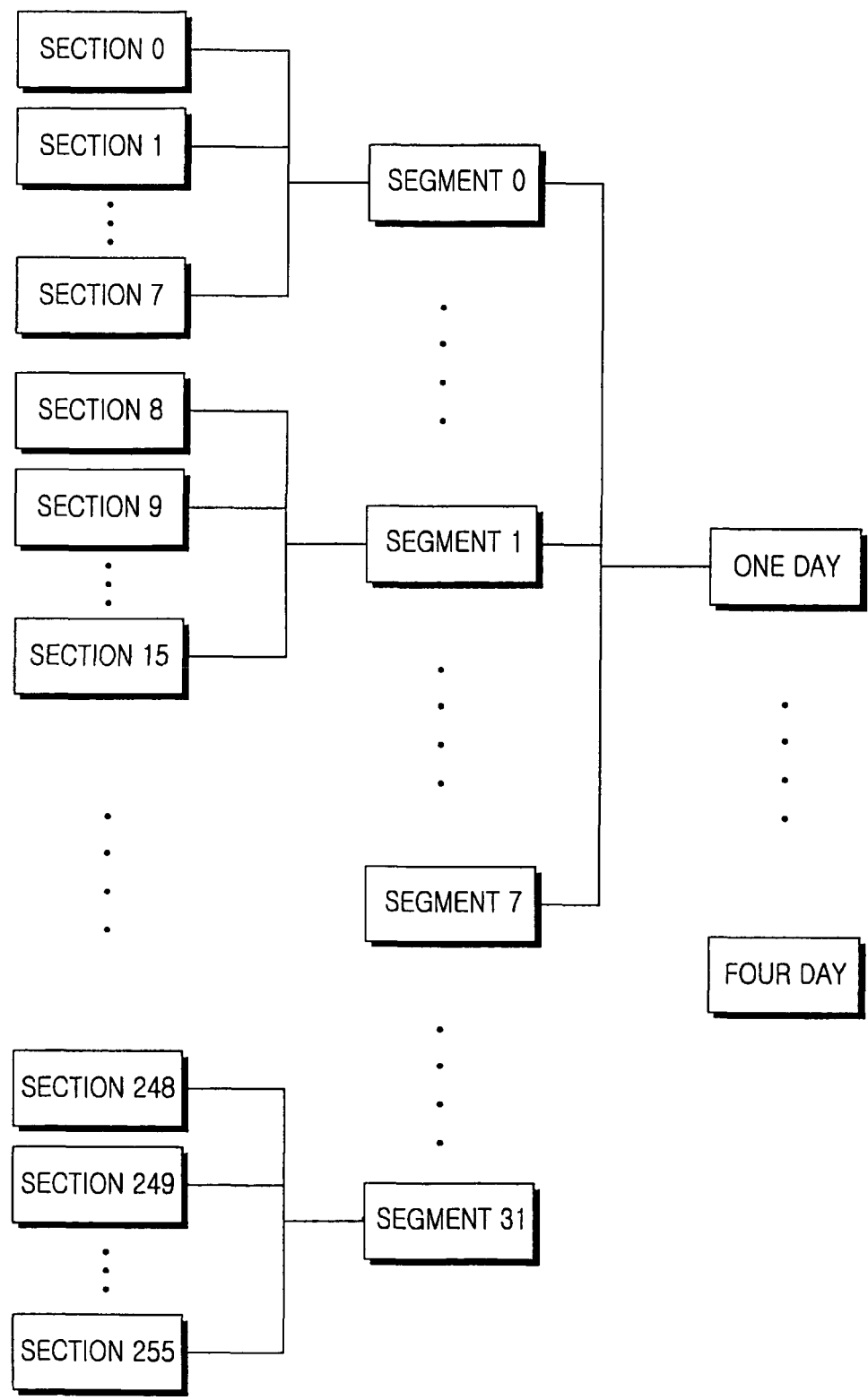
FIG. 1 illustrates the structure of an EIT schedule.

Hereinafter, a preferred embodiment of the present invention will be described in detail with reference to the accompanying drawings. Note that the same or similar components in the drawings are designated by the same reference numerals as far as possible although they are shown in different drawings. Although many specific items such as detailed broadcast time and types of broadcast programs are shown in the following description, these are provided only for the purpose of overall comprehension about the present invention. Therefore, it is generally known to those skilled in the art that the present invention can be embodied without being limited by the specific items. In the following description of the present invention, a detailed description of known functions and configurations incorporated herein will be omitted when it may make the subject matter of the present invention unclear.

Figure 4:
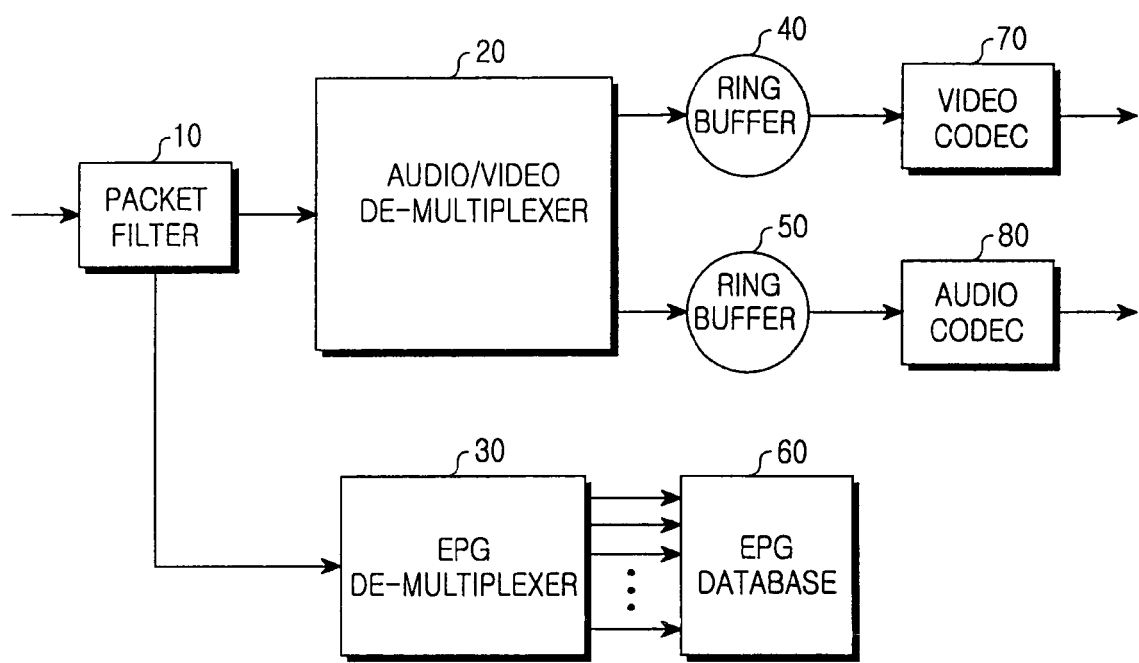
FIG. 4 is a block diagram illustrating the structure of a DMB receiving terminal according to the present invention.

FIG. 4 is a block diagram illustrating the structure of a DMB receiving terminal according to the present invention.

A packet filter 10 filters an electric program guide (EPG) and an audio/video packet so as to deliver the EPG and the audio/video packet to an audio/video de-multiplexer 20 and an EPG de-multiplexer 30. Audio and video signals parsed in the audio/video de-multiplexer 20 are stored in ring buffers 40 and 50, respectively. The audio and video signals buffered in the ring buffers 40 and 50 are delivered to video and audio codecs 70 and 80, respectively. The EPG de-multiplexer 30 stores parsed information (EIT P/F, EIT schedule, etc.) in an EPG database 60.

Figure 5:
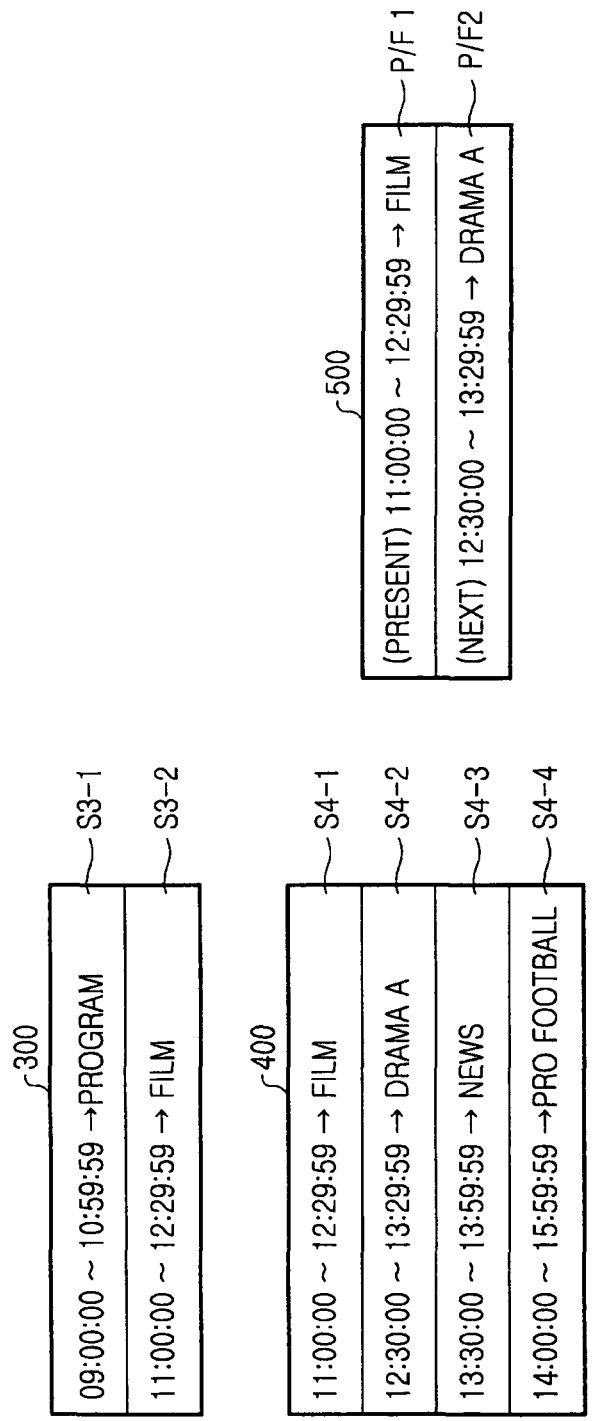
FIGS. 5 and 6 illustrate a broadcast program time table stored in an EPG database according to the present invention.
Figure 6:
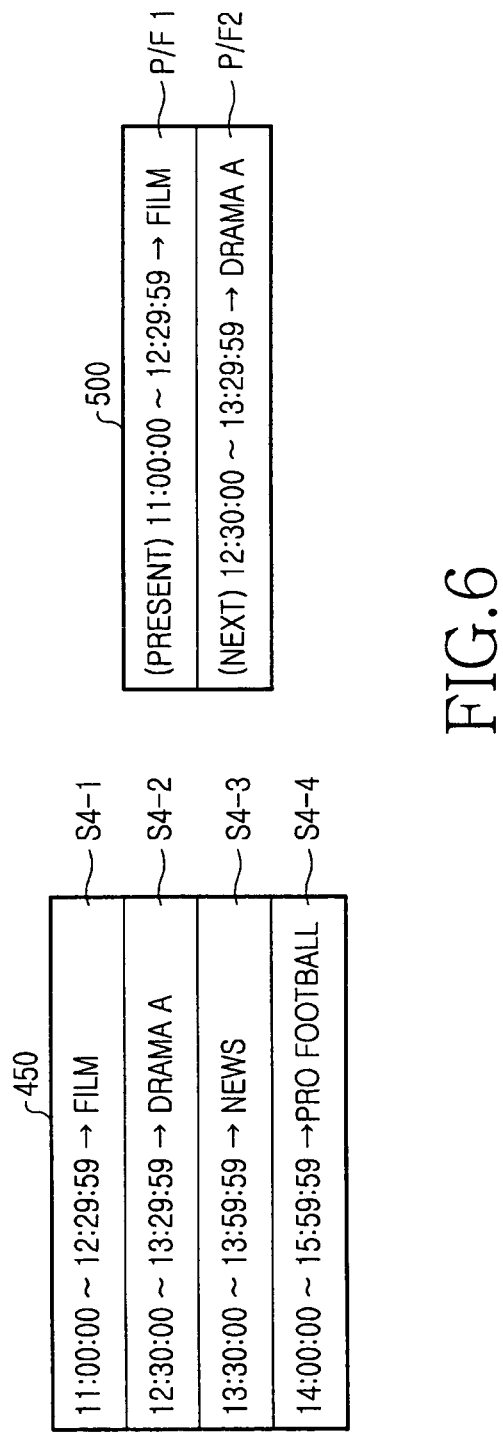

FIGS. 5 and 6 illustrate broadcast program time tables stored in the EPG database 60 according to the present invention.

Left views show EIT schedule storage areas (e.g., a storage area of the third segment 300 and a storage area of the fourth segment 400) forming broadcast program time tables stored in the EPG database, and right views shows an EIT P/F storage area 500. The shown EIT P/F (P/F 1) is sent between 11:00:00 and 12:29:59.

When the broadcast program time tables are made and stored in the EPG database 60, two cases must be considered. In detail, on the assumption that the discontinuity of a broadcast program occurs in segment #K, the two cases are a case where there is segment #K−1 (a previous segment of the segment #K) and a case where there is no previous segment #K−1. If the EPG schedule is received before and after a time point of the absence of the segment #K−1 (12:00:00 in FIGS. 5 and 6), a broadcast channel receiving segment #K−1 may or may not exist. In other words, both segments #3 and #4 may be received as shown in FIG. 5, or only the segment #4 may be received as shown in FIG. 6 (K=4 and K−1=3).

However, a problem occurs in that the receiving state of segment #K−1 can be recognized after the entire EPG is received. Therefore, present broadcast program information of the EIT P/F is inserted into the first area in the program information area of segment #N, and, if segment #K−1 is received so that the same program information is repeated, redundant program information may be deleted.

Since program information between 11:00:00 and 12:29:59 is overlapped as shown in FIG. 5, redundant program information is deleted. Namely, since information about a film broadcasted between 11:00:00 and 12:29:59 is repeated, redundant film information is deleted.

Figure 7:
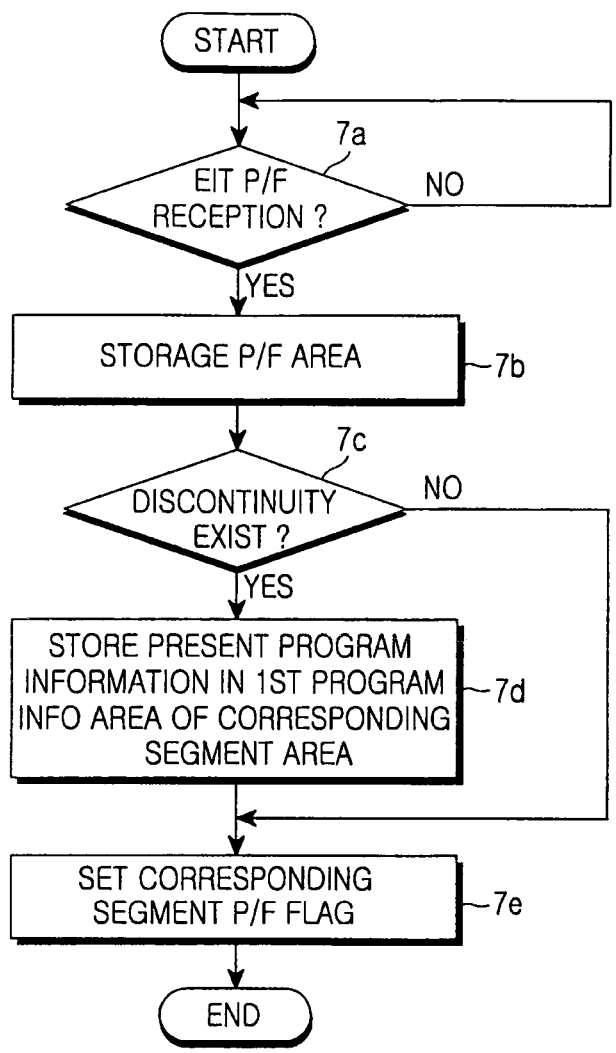
FIG. 7 is a flowchart illustrating a storage method for EIT P/F according to the present invention.

FIG. 7 is a flowchart illustrating a method for storing EIT P/F information according to the present invention.

In step 7a, it is determined if EIT P/F information is received. If the EIT P/F information is received, the EIT P/F is stored in a P/F area (reference numeral 500 shown in FIG. 5 or 6) of the EPG database 60 in step 7b. In step 7c, a segment, in which program discontinuity of the EIT schedule occurs, is determined. If the segment, in which program discontinuity of the EIT schedule occurs, is confirmed, present program information of the received EIT P/F information is stored in the first program information area of a corresponding segment area in the EPG database in step 7d. Sequentially, a corresponding segment P/F flag is set in step 7e.

Herein, the segment P/F flag represents whether the present program information of the received EIT P/F information is stored in the first program information area of a segment area. The segment P/F flag may exist with respect to each segment.

Figure 8:
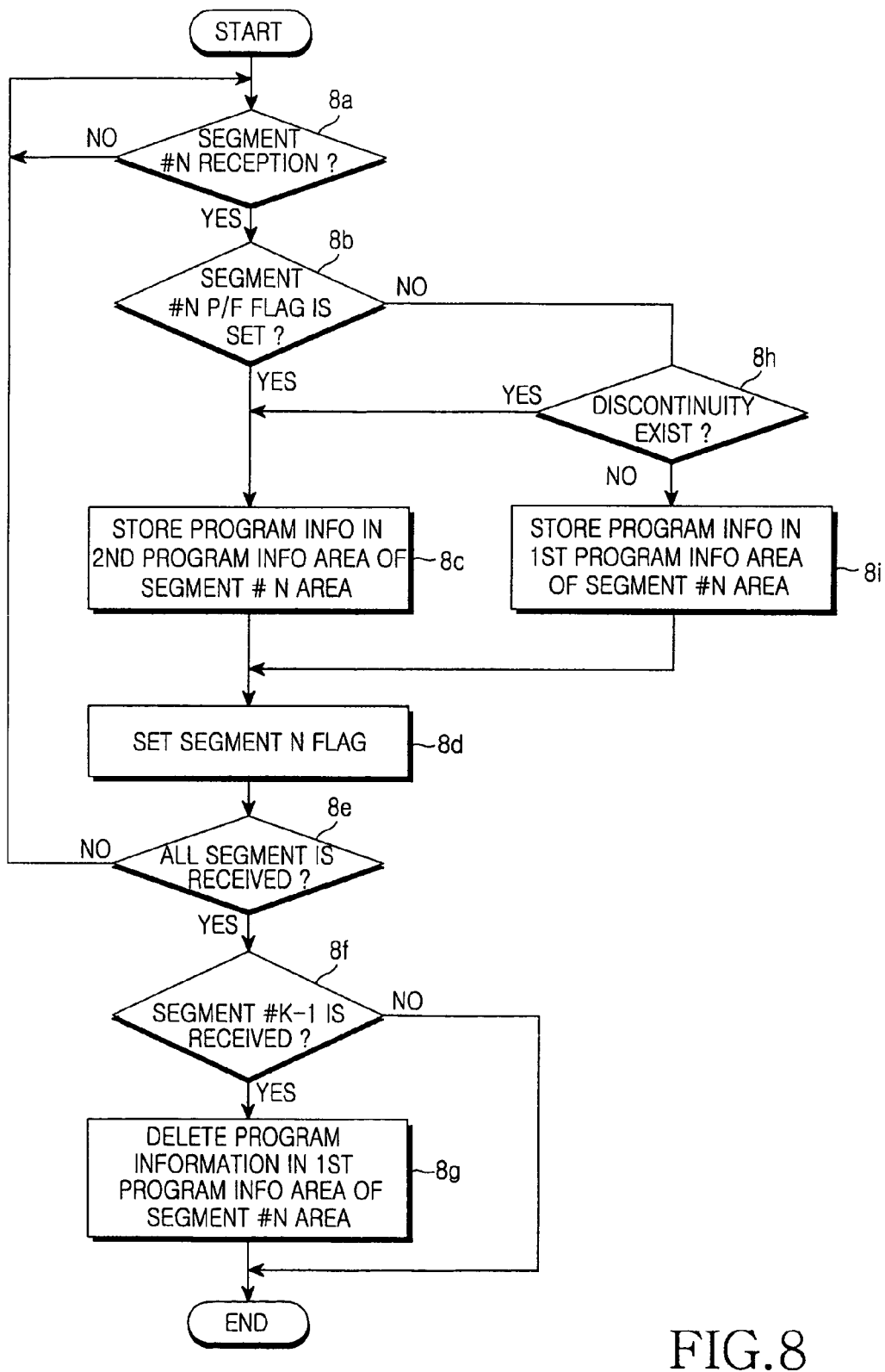
FIG. 8 is a flowchart illustrating a method for forming a broadcast program timetable according to the present invention.

FIG. 8 is a flowchart illustrating a method for making a broadcast program according to the present invention.

Figure 2:
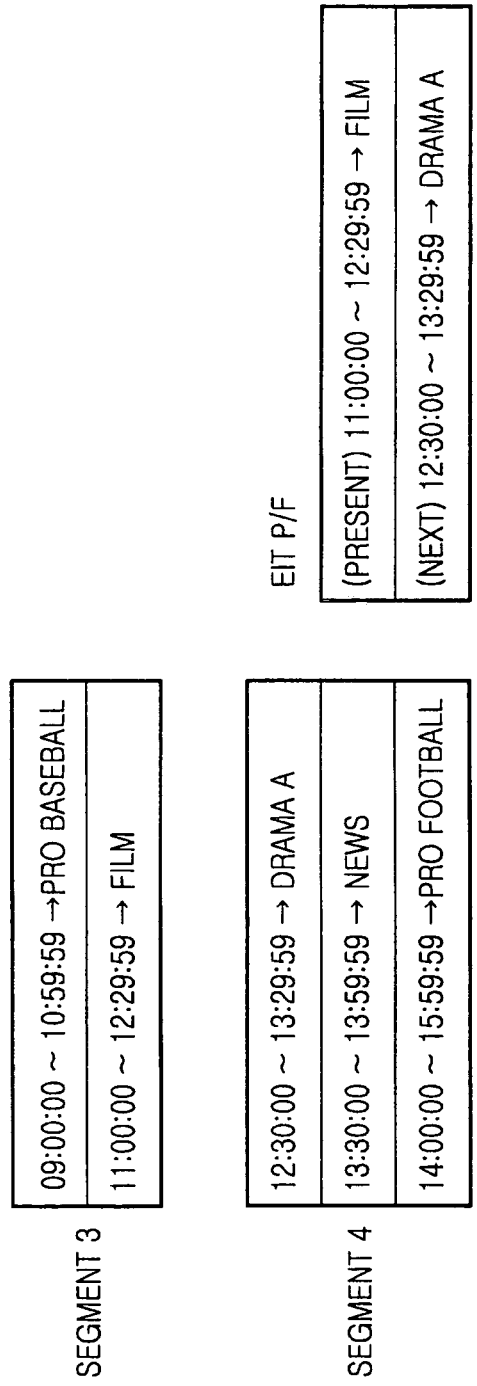
FIG. 2 and FIG. 3 illustrate the structures of the segments of the EIT schedule area and the EIT P/F area.
Figure 3:
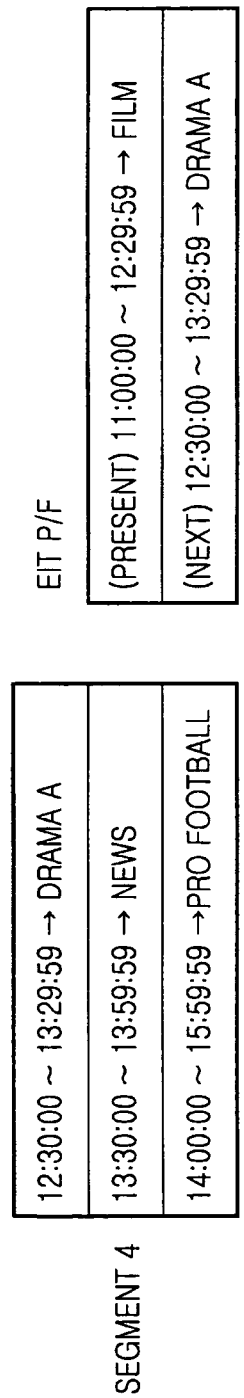

According to the present invention, it is assumed that the time for receiving the EIT schedule is 12:00:00. In this case, referring to FIG. 2, discontinuity of broadcast program may occur in segment #4 having program information from 12:30:00. Hereinafter, it is assumed that the discontinuity of broadcast program occurs in segment #K. Segment #N denotes a segment included in the EIT schedule received at 12:00:00.

In step 8a, it is determined if segment #N of the EIT schedule is received.

If segment #N of the EIT schedule is received, it is determined whether the P/F flag of the segment #N is set in step 8b. If the P/F flag of the segment #N is set, program information of the received segment #N is stored at the second program area of the segment #N in the EPG database 60 in step 8c, and then step 8d is performed.

In contrast, if the P/F flag of the segment #N is not set in step 8b, it is then determined if a discontinuity exists in step 8h. If a discontinuity exists, step 8c is performed. If no discontinuity exists, the program information of the received segment #N is stored at the first program area of the segment #N in the EPG database 60 in step 8h. Then, step 8d is performed.

A segment N flag is set in step 8d. Herein, the segment N flag denotes that segment #N is received and exists with respect to each segment included in the EIT schedule. For example, if the EIT schedule is received at 12:00:00, segments included in the received EIT schedule correspond to segment #4 to #7 for program information after 12:00:00. Accordingly, the segment N flag exists for each segment such that it can be determined if the segments #4 to #7 are received. However, the flag does not have to exist in order to determine if all segments are received.

It is determined if all segments are received in step 8e. If the all segments are not received, the process returns to step 8a.

If all segments are received, it is determined if segment #K−1 is received in step 8f. If the segment #K−1 is received, the present program information of the EIT P/F stored at the first program information area of the segment area N in the EPG database 60 is deleted in step 8g. As described above, steps 8f and 8g are performed in order to determine if the segment #K−1 is repeated. According to the present invention, since it is assumed that segment #N, in which program discontinuity occurs, is segment #4, segment #K−1 becomes segment #3. Referring to FIG. 5, program information stored in the second program information area S3-2 of segment #3 is equal to program information stored in the first program information area S4-1 of segment #4. In this case, the program information stored in the first program information area S4-1 of segment #4 is deleted. The program information stored in the first program information area S4-1 of segment #4 has been previously stored through a procedure of receiving and processing the EIT P/F in FIG. 7 by determining an indication that program discontinuity exists in segment #4.

The EIT schedule may be received without schedule contents (program information). Although the EIT schedule is received, when there is no program information, program discontinuity cannot be confirmed. Accordingly, a next EIT schedule must be waited for. According to the present invention, it is assumed that this case does not occur. However, if this assumption does not exist, a step of determining if program information is included in segment #N is inserted between step 8b and 8h. Step 8h is performed if the program information is included in the segment #N, and step 8a is returned to if the program information is not included in the segment #N.

In the step 8a, 8b, 8h and 8c, the first program information area is cleared, and the program information of the received segment #N is stored in the second program information area. This is performed in order to store the present program information of EIT P/F in the empty first program information area when the EIT P/F is received thereafter.

If an EPG is received at a time point where segment #K−1 is not transmitted (after 12:00:00 in FIG. 2), only the case shown in FIG. 6 occurs. Since even this case corresponds to a part of the procedure shown in FIG. 8, continuity of program information is ensured.

As described above, according to the present invention, when broadcast program time table is made in a database by receiving an EPG, EIT schedule and present program information of EIT P/F are used, so that it is possible to ensure program continuity.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for forming a broadcast program time table in an Electric Program Guide (EPG) database, the method comprising the steps of:
   storing present program information of Event Information Table Present/Follow (EIT P/F) information in a first program information area of a corresponding segment area in the EPG database by determining a segment, in which program discontinuity occurs, in an Event Information Table (EIT) schedule if the EIT P/F information is received; and
   storing program information of an $N^{th}$ segment in a second program information area when the $N^{th}$ segment of the EIT schedule is received, and program discontinuity occurs in the $N^{th}$ segment, the $N^{th}$ segment being a segment included in the received EIT schedule,
   wherein determining whether program discontinuity occurs in a particular segment comprises determining whether the EIT includes program information of all programs that end broadcasting within a time period corresponding to the particular segment and begin broadcasting prior to the time period corresponding to the particular segment.

2. A method for forming a broadcast program time table in an Electric Program Guide (EPG) database, the method comprising the steps of:
   storing present program information of Event Information Table Present/Follow (EIT P/F) information in a first program information area of a corresponding segment area in the EPG database by determining a segment, in which program discontinuity occurs, in an event information table (EIT) schedule when the EIT P/F information is received;
   determining whether the present program information of the EIT P/F information is stored in the first program information area of an $N^{th}$ segment area of the EPG database if the $N^{th}$ segment of the EIT schedule is received, the $N^{th}$ segment being a segment included in the received EIT schedule;
   storing program information of the $N^{th}$ segment in a second program information area when the stored present program information of the EIT P/F information exists;
   determining whether program discontinuity occurs in the $N^{th}$ segment when the stored present program information of the EIT P/F information does not exist;
   storing program information of the $N^{th}$ segment in the second program information area when program discontinuity occurs in the $N^{th}$ segment; and
   storing the program information of the $N^{th}$ segment in the first program information area when program discontinuity does not occur,
   wherein determining whether program discontinuity occurs in the $N^{th}$ particular segment comprises determining whether the EIT includes program information of all programs that end broadcasting within a time period corresponding to the $N^{th}$ particular segment and begin broadcasting prior to the time period corresponding to the $N^{th}$ particular segment.

3. The method as claimed in claim 2, further comprising:
   determining whether all segments of corresponding EIT schedule are received;
   determining whether a K−$1^{th}$ segment is received when the all segments are received, the K−$1^{th}$ segment being a previous segment of a $K^{th}$ segment in which program discontinuity occurs; and
   deleting the present program information of the EIT P/F information stored in the first program information area of the $N^{th}$ segment of the EPG database when the K−$1^{th}$ segment is received.

* * * * *